United States Patent [19]

McCulloch

[11] Patent Number: 4,741,209
[45] Date of Patent: May 3, 1988

[54] APPARATUS FOR DETECTING THE BOUNDARY BETWEEN TWO SUBSTANCES

[75] Inventor: Reg W. McCulloch, 27 Bradford Cir., Oak Ridge, Tenn 37830

[73] Assignee: Reg McCulloch, Oak Ridge, Tenn.

[21] Appl. No.: 799,617

[22] Filed: Nov. 19, 1985

[51] Int. Cl.[4] .............................................. G01F 23/22
[52] U.S. Cl. ........................................ 73/295; 374/54; 376/258
[58] Field of Search ........................ 73/295; 340/622; 374/45, 54; 338/27; 376/258

[56] References Cited

U.S. PATENT DOCUMENTS

| | | | |
|---|---|---|---|
| 2,702,476 | 2/1955 | De Boisblanc | 73/295 |
| 3,280,627 | 10/1966 | Cousins | 73/295 |
| 3,301,055 | 1/1967 | Williams et al. | 73/295 |
| 3,308,665 | 3/1967 | Williams et al. | 73/295 |
| 3,360,990 | 1/1968 | Greene et al. | 73/295 |
| 3,465,587 | 9/1969 | Pierce | 73/295 |
| 3,964,311 | 6/1976 | Holmen | 73/295 |
| 4,406,011 | 9/1983 | Burns | 376/258 |
| 4,423,629 | 1/1984 | Ara et al. | 73/295 |
| 4,425,795 | 1/1984 | Albrecht et al. | 73/295 |
| 4,439,396 | 3/1984 | Rolstad | 376/247 |
| 4,440,717 | 4/1984 | Bevilacqua | 73/295 |
| 4,449,403 | 5/1984 | McQueen | 73/295 |
| 4,592,230 | 6/1986 | Waring et al. | 73/295 |
| 4,603,580 | 8/1986 | Waring | 73/295 |

FOREIGN PATENT DOCUMENTS 0155207  5/1982  German Democratic Rep. ... 73/295

OTHER PUBLICATIONS

Article entitled "Bicoth Water Level Sensor and Its Applicability to Measurement of In-Core Thermal/Hydraulic Performance", by K. Ara et al., and printed in In Core Instrumentation and Reactor Assessment Instrumentation, Proceedings of a Specialists' Meeting, by Nuclear Energy Agency, 1984.

Primary Examiner—Charles Frankfort
Assistant Examiner—Thomas B. Will
Attorney, Agent, or Firm—Luedeka, Hodges & Neely

[57] ABSTRACT

The specification discloses a boundary detector for locating the boundary between two substances having different thermal absorption characteristics. In one embodiment, the detector monitors the level of a coolant in a vessel in which case the upper surface of the coolant constitutes the detected boundary. An elongate sensor is constructed of a plurality of segments of different material connected end-to-end to form a series of thermocouple junctions. This sensor is disposed across the boundary in the two substances, and a segmented heater cable is used to heat selected ones of the thermocouple junctions. The sensor and the heater cable are electrically insulated by thermally conductive material that will transfer heat to the substances in which the sensor is disposed, and because of this heat transfer, the temperatures of the heated junctions are, in part, dependent upon the substance in which it is located. By monitoring the voltage potential across the sensor, the boundary may be detected and located. Analog, digital and discrete embodiments are disclosed.

4 Claims, 4 Drawing Sheets

APPARATUS FOR DETECTING THE BOUNDARY BETWEEN TWO SUBSTANCES

FIELD OF INVENTION

The present invention relates to boundary detectors and particularly relates to a boundary detector using thermocouples to monitor the level of a coolant in a vessel.

BACKGROUND AND SUMMARY OF INVENTION

Level detectors are used to measure the level of a liquid in a vessel and, in function, the detectors are usually locating a boundary between the liquid in the vessel and the gas above it. Thus, level detectors may also be described as boundary detectors where the upper surface of the liquid is the boundary that is detected.

In some level detectors, such as disclosed in U.S. Pat. Nos. 4,418,035; 4,406,011; and 4,440,717, sensors are placed at various levels within a vessel and they determine the presence or the absence of the liquid at a particular location. Basically, these devices determine whether a sensing element is disposed in the liquid or in the gas above the liquid. The sensing element is usually heated at a constant rate and the temperature of the sensing element is monitored. Since the liquid will absorb heat from the sensing element faster than air or gas, the temperature of the heated sensing element will be indicative of the presence or absence of the liquid. Thus, by measuring the temperature of a heated sensing element, these devices determine the presence or absence of the liquid at a particular location.

One of the disadvantages of level detectors such as disclosed in the aforementioned patents is the size and expense of the detector. For example, in U.S. Pat. Nos. 4,418,035 and 4,406,011 a thermocouple circuit containing two wires is required for each position to be monitored. Since it is usually desirable to monitor a number of positions in order to accurately determine the level of a liquid, these devices require numerous wires. Because of the number of needed wires, the level detector must have a relatively large cross-section or the wires must be made very small. Of course, small wires are both expensive to manufacture and delicate to use.

In one embodiment of the present invention, an analog level detector or boundary detector provides an accurate indication of the level of the liquid within a vessel without the attendant size and expense problems associated with known level detectors of this type. The apparatus is designed for detecting the location of a boundary between two substances having different thermal absorption properties. An elongate sensor is disposed across the boundary between the two substances and the sensor is constructed of a plurality of a-type segments and b-type segments. These segments are connected with alternating types being connected end-to-end so that a series of a-type to b-type junctions are formed along the sensor. The a-type segments are constructed of a material different from the b-type segments so that thermocouple junctions are formed therebetween. A segmented heater cable is provided for heating selected ones of the thermocouple junctions. Preferably, the heater cable heats every other one of the thermocouple junctions so that a series of thermocouple pairs (a heated junction and a cold junction) are created such that the total voltage potential across the sensor is the sum of the differential voltages created by the thermocouple pairs. Electrical insulation is provided to insulate the sensor from the heater cable and to insulate the heater cable and the sensor from the two substances in which the sensor is disposed. The electrical insulation is thermally conductive so that heat is transferred from the heater cable to the sensor and from the sensor and heater cable to the substances in which the sensor is disposed.

When a heated thermocouple junction is disposed in a substance having a low thermal absorption property, such as a gas, the heated junction will have a relatively high temperature compared to the cold junction and a voltage potential will appear across the thermocouple pair. When the heated thermocouple is disposed in a substance having a relatively high thermal absorption characteristic, the heated thermocouple will be cooled to a relatively low temperature. In such case, the thermocouple pair will have a greatly reduced voltage potential. Since the voltage potential across the sensor will be the sum of the voltage potentials produced by the thermocouple pairs, the voltage potential across the sensor will vary inversely with the number of heated thermocouple junctions that are disposed in a substance having a high thermal absorption characteristic. In the case of a sensor disposed to detect the level of a liquid, the voltage potential across the sensor will grow smaller as the liquid level rises because the liquid will cool the heated thermocouple junctions. Thus, to measure the location of a boundary or the level of a liquid, a meter is provided to monitor the voltage across the sensor. In this embodiment, multiple positions or levels may be monitored by a single sensor wire and one return wire. Thus the present invention results in significant savings in terms of size and expense when compared to known conventional thermocouple type detectors.

In accordance with another aspect of the invention, a digital detector includes a plurality of measuring wires disposed in a parallel relationship with each of said measuring wires being constructed of a-type segments and b-type segments. These segments are connected with alternating types connected end-to-end so that a series of a-type to b-type junctions are formed in said plurality of measuring wires. As before, these junctions are thermocouple junctions.

A segmented heater cable is used to heat each of the thermocouple junctions in the plurality of measuring wires. Electrical insulation is provided for insulating the measuring wires, and the insulation is thermally conductive for transferring heat from the heater cable to the measuring wires and from the measuring wires and heater cable to the environment in which the measuring wires are disposed. Thus, as before, the temperature across the heated junctions is dependent upon the substance in which the junctions are disposed. The thermocouple junctions in the plurality of measuring wires are disposed so that the voltage potential across the plurality of measuring wires is a digital representation of the position of the boundary between two substances or of a level a coolant in a vessel. A circuit is provided for detecting the voltage potential across each of the plurality of measuring wires and for producing a digital representation of the position of the boundary.

In the digital embodiment, the minimum number of measurement wires needed to monitor x locations is $2^x$ plus a return wire. For example, two measurement wires are needed to measure four positions and three measurement wires are needed to measure eight positions. Thus, the digital embodiment also results in a substantial savings of size and expense relative to known detectors.

In accordance with yet another aspect of the invention, the detector may be constructed having a plurality of measurement wires disposed in a vessel that sense the presence and absence of a coolant only at one level. In such embodiment, the sensor wires are constructed primarily of a-type material with one segment of b-type material which forms one upper and one lower thermocouple junction in the measurement wire. A segmented heater cable is used to heat the upper thermocouple junction and the lower thermocouple junctions remain cool. When the coolant level is below an upper thermocouple, a voltage potential appears across the measurement wire, but when the coolant reaches the upper thermocouple, both the upper and lower thermocouple are essentially the same temperature and the voltage potential across the measurement wire is about zero. In this embodiment, a common return wire is shared by all measurement wires and the voltage potential appearing on the measurement wires relative to the common wire will indicate the coolant level. In this embodiment, only one wire is needed for each monitoring position, and all wires share a common return. Thus, this embodiment also results in a savings as to the number of needed wires and attendant expense as compared to known devices.

The above described analog, digital and discrete embodiments may also be combined into one system. In such case, each of the three systems would share a common return wire and a common segmented heater cable. In such embodiment, the devices could be cross checked as a quality control measure.

BRIEF DESCRIPTION OF THE DRAWINGS

The present invention may best be understood by reference to the following Detailed Description of an exemplary embodiment when taken in conjunction with the drawings in which:

FIGS. 3a-3g are seven graphs showing the voltages on measurement lines 2, 3, 4, 5, 6, 7 and 8 graphed against the coolant level as shown in FIG. 1:

DETAILED DESCRIPTION OF THE DRAWINGS

Figure 1:
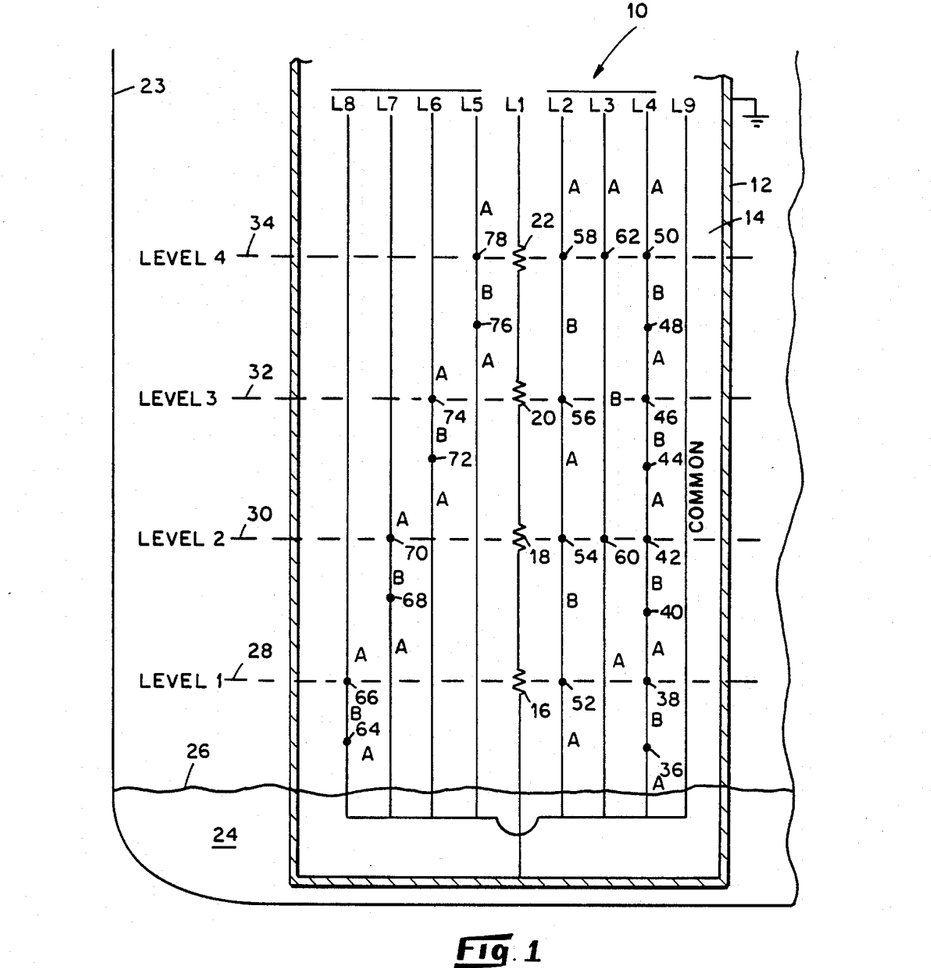
FIG. 1 is a schematic diagram of a boundary detector incorporating an analog detector, a digital detector and a discrete detector.
Figure 2:
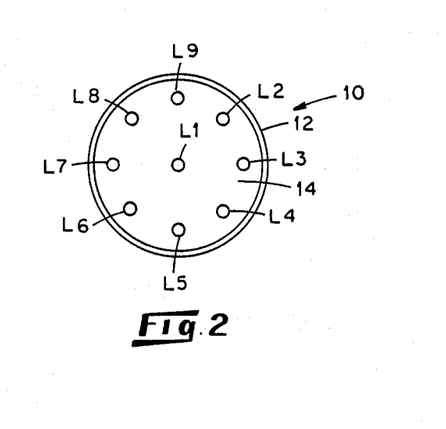
FIG. 2 is a cross-sectional view of the detector shown in FIG. 1.

Referring now to the drawings in which like or corresponding reference characters refer to like or corresponding parts throughout the several views, a circuit diagram is shown in FIG. 1 of a boundary detector 10 that is being used as a level detector, and FIG. 2 is a somewhat diagrammatical transverse cross-sectional view of the detector 10. Referring to FIGS. 1 and 2, the detector 10 includes an outer sheath 12 that is preferably constructed of stainless steel, and lines L1 through L9 are disposed within the stainless steel sheath 12. Lines L1 through L9 are separated by insulation 14 which is preferably powdered alumina. L1 is a segmented heater cable and includes heater segments 16, 18, 20 and 22 and the lower end of line L1 is connected to the stainless sheath 12 which is in turn connected to ground. In some environments, it will be preferred not to use the sheath 12 as a ground for the segmented heater cable, line L1, and in such case, a separate return wire may be used.

Lines L2-L8 may be referred to as measuring wires and they are constructed of a-type segments, preferably alumel, and b-type segments, preferably chromel. A-type segments are shown in FIG. 1 with the letter "A" adjacent to and to the right of such segment. Likewise, b-type segments are indicated by the letter "B". The junctions between a-type and b-type segments are indicated by black dots, and line L9 is a common return line that is connected to the outer ends of lines L1-L8.

One use for the detector 10 shown in FIGS. 1 and 2 is to measure the level of a coolant 24 in a vessel 23 and in FIG. 1, the coolant 24 has reached a level indicated by the boundary 26. For purposes of reference, dashed lines 28, 30, 32 and 34 are used to indicate, respectively, levels 1, 2, 3 and 4. The detector 10 illustrated in FIG. 1 is actually a combination analog detector, a digital detector and a discrete detector. Line L4 constitutes the analog detector, lines L2 and L3 constitute the digital detector and lines L5, L6, L7 and L8 constitute the discrete detector. The term discrete detector is used to indicate that each line L5-L8 monitors a discrete level within the vessel and only that level.

The operation of the detector 10 may be explained with reference to FIGS. 3a-3g which are graphs of the voltage potential on lines L2-L8. In each graph, voltage is shown on the vertical axis and the level of the coolant 24 is graphed on the horizontal axis. Referring first to line L4 in FIG. 1 and FIG. 3c, the analog portion of the detector 10 is formed by lines L4 and L9. Line L4 includes eight thermocouple junctions 36-50. The junctions 38, 42, 46 and 50 are located proximate to the heater segments 16, 18, 20 and 22, are heated thereby, and are referred to as "heated junctions". The junctions 36, 40, 44 and 48 are located more distantly from the heater segments 16, 18, 20 and 22 and are referred to as "cold" junctions.

Figures 3, 3A, 3G:
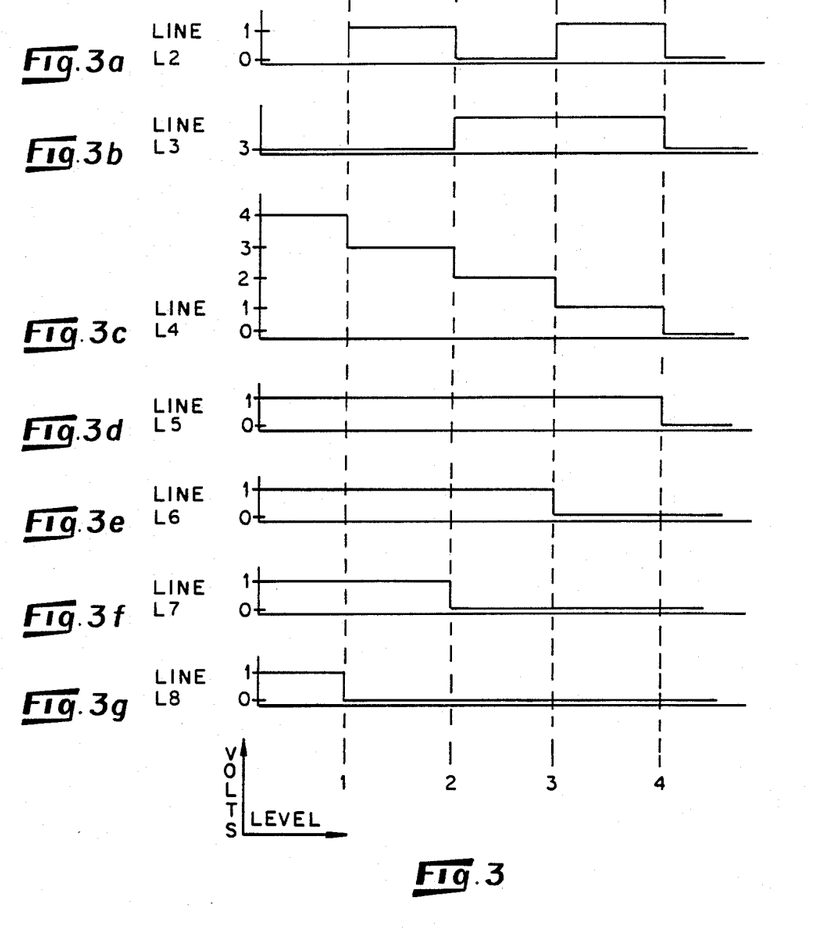

In FIGS. 3a-3g, it has been assumed that the cold junctions 36, 40, 44 and 48 are, in fact, "cold" regardless of whether they are in the coolant 24. However, the heated junctions 38, 42, 46 and 50 will be "hot" junctions when they are not in the coolant 24, but they will be "cold" when the coolant rises to cover those junctions. Referring to FIG. 3c and FIG. 1, it will be noted that the voltage appearing on line L4 will be four volts so long as the boundary 26 is below level one. when the coolant 24 and the boundary 26 rise to level one, the coolant 24 will absorb the heat from the junction 38 and junction 38 will become cool. Thus the voltage appearing across line L4, that is the voltage appearing between lines L4 and L9, will drop to three volts. When the coolant rises to cover junction 40, there will be no change in voltage between lines L4 and L9. However, when the coolant 24 rises to level two, the junction 42 will be cool and the voltage will drop to two volts as shown in FIG. 3c. Likewise, when junction 46 is covered by the coolant 24, the voltage will drop to one volt and when junction 50 is covered the voltage will drop to zero volts.

In discussing the voltages with reference to lines L2–L9, it will be appreciated that normalized voltages are being used. One volt represents the differential voltage produced by the combination of a hot thermocouple junction and a cold thermocouple junction which is sometimes herein referred to as a thermocouple junction pair. In actual operation, the measured voltage potential of a thermocouple pair, such as junctions 38 and 36 would be dependent upon the actual materials used in constructing the lines L2–L8 and the temperature of the junctions.

As indicated by the previous discussion, voltages of four, three, two and one line L4 would indicate, respectively, that the boundary 26 was below level one, level two, level three and level four. A voltage of zero on line L4 would indicate that the boundary 26 has risen above level four. Thus, the voltage on line L4 is an analog indication of the level of coolant 24 within the vessel 23.

A digital embodiment of the present invention is illustrated by lines L2 and L3 and the voltages appearing on these lines are graphed in FIGS. 3a and 3b. Lines L2 and L3 may be considered as producing a digital number indicative of the level of boundary 26. Voltage on line L2 may be considered to be the first or right most place in the digital number and the voltage on line L3 may be considered to be the second digit of the digital number. Lines L2 and L3 are constructed of a-type and b-type segments such that thermocouple junctions 52–62 are formed therein. Each of the junctions 52–62 are positioned to be heated by the heater segments 16, 18, 20 and 22. When the boundary 26 is in the position shown in FIG. 1, none of the junctions 52–62 are covered and they are all hot. Thus, the voltages appearing on lines L2 and L3 are both zero as shown in FIGS. 3a and 3b. When the boundary 26 rises to level one and covers junction 52, this junction is cooled and the voltage on line L2 goes to one and the digital number produced by lines L2 and L3 is "01". When the boundary 26 rises to level two, junctions 54 and 60 are cooled and the voltages on lines L2 and L3 go to zero and one, respectively. The digital number produced by lines L2 and L3 when the boundary 26 exceeds level two is "10". When the boundary 26 rises to level three and covers the junction 56, it is cooled and the voltage on line L2 goes to "1" producing the digital number "11". Finally, when the boundary 26 rises to level four and cools junctions 58 and 62, the voltage on lines L2 and L3 drops to zero and the digital number produced thereby is "00".

It should be noted that the digital embodiment illustrated by lines L2 and L3 unambiguously locates the boundary 26 through four regions. That is, the number "00" indicates that boundary 26 is below level one; "01" indicates that the boundary 26 is between levels one and two; "10" indicates that the boundary is between levels two and three; and "11" indicates that the boundary 26 is between levels three and four. However, if the boundary 26 rises to level four or above, the voltages will again go to zero and the system is ambiguous, that is, "00" will mean that the boundary 26 is either below level one or above level four. If it is desired to unambiguously determine the position of the boundary 26 in five or more regions, additional lines need to be added. To construct a digital detector that will unambiguously locate the boundary 26 in eight different regions, three wires will be needed. To detect the boundary 26 in sixteen regions, four wires will be needed. In this digital embodiment, the number of regions that may be monitored is equal to $2^x$ where "x" is the number of measurement wires. Of course, there must also be a common or return line L9.

Lines L5–L8 illustrate a discrete embodiment of the detector 10. Each of the lines L5–L8 is constructed of a-type and b-type segments so that each line includes two thermocouple junctions constituting a thermocouple junction pair. Junctions 66, 70, 74 and 78 are heated and junctions 64, 68, 72 and 76 are cool junctions. The voltages on lines L5–L8 are graphed in FIGS. 3d–3g and, as indicated in the graphs, a nominal voltage of "one" appears on all lines L5–L8 when the boundary 26 is in the position shown in FIG. 1. When the boundary 26 rises to cover the junctions 66, the voltage on line L8 will drop to zero. Likewise, when the boundary 26 rises to cover junctions 70, 74 and 78, the voltages on lines L7, L6 and L5, respectively, will drop to zero. Thus, if the voltages on lines L5–L8 are one, the boundary is below level one. If line L8 is zero and lines L5–L7 are one, the boundary is between levels one and two. If lines L7 and L8 are zero and lines L5 and L6 are one, the boundary 26 is between levels two and three. If lines L6, L7 and L8 are zero and line L5 is one, the boundary 26 is between levels three and four and if all four lines L5–L8 are zero, the boundary 26 is above level four.

Figure 4:
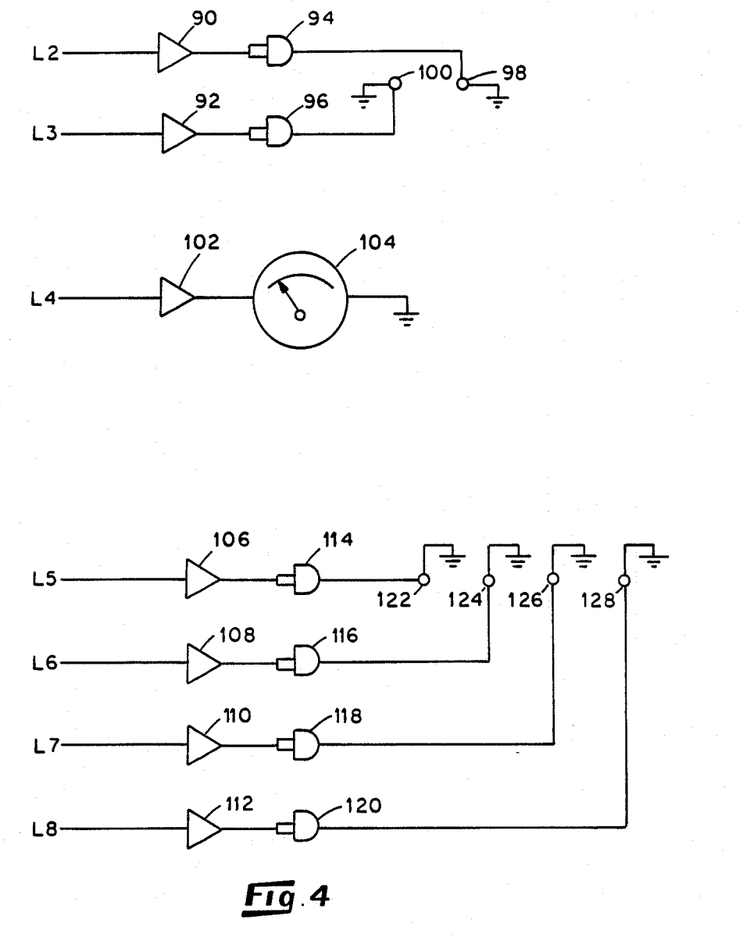
FIG. 4 is a somewhat diagrammatical circuit diagram of indicators used to display information on lines 2-8 shown in FIG. 1.

In most applications, the output from lines L2–L8 would become inputs to a data acquisition circuit which would process the detected voltages for some type of monitoring system. For example, the information from lines L2–L8 could be inputs to a computer system that was monitoring the level of the coolant in a nuclear reactor. However, for the purpose of illustration, FIG. 4 illustrates a simple method of visually indicating the data appearing on lines L2–L8. In the circuit shown in FIG. 4, lines L2 and L3 are applied through amplifiers 90 and 92 to both inputs of AND gates 94 and 96. The output of the AND gates 94 and 96 is applied to lamps 98 and 100 which may be LED's. A zero voltage on lines L2 and L3 will turn the lamps 98 and 100 off, while a voltage of one will turn the lamps 98 and 100 on. Thus, lamps 98 and 100 provide a simple digital indication of the level of boundary 26.

The voltage on line L4 is applied through an amplifier 102 to a volt meter 104. Since the voltage appearing on line L4 is an analog indication of the level of boundary 26, the display on meter 104 will be a corresponding visual indication of the level of boundary 26.

The circuits connected to lines L5–L8 are identical to those connected to those lines L2–L3. Lines L5–L8 are connected through amplifiers 106, 108, 110 and 112 as inputs to AND gates 114, 116, 118 and 120. The outputs to these AND gates are applied to lamps 122, 124, 126 and 128. When the voltages on lines L5–L8 are one, lamps 122–128 will turn on and when the voltages on lines L5–L8 go to zero, the lamps 122–128 will turn off. Thus, lamps 122 and 128 will provide discrete indications of the level of the boundary 26 within the vessel 23. It will be appreciated that the analog detector 10 illustrated by line L4 in FIG. 1 requires the least number of wires and is the least expensive of the embodiments described herein. Thus, for many applications, the detector 10 would include only lines L4 and L9 along with the segmented heater cable on line L1 and the sheath 12.

In order for the analog detector 10 represented by line L4 to work properly, the overall detector 10 must be configured to avoid heating the cold thermocouple junctions 36, 40, 44 and 48. The design of line L4 and detector 10 may best be understood by reference to FIG. 5 which is a longitudinal cross-sectional view of a detector 10 which includes only lines L1, L4 and L9 and sheath 12. The cross-sectional view of FIG. 5 is broken away so that only heater segment 22 and thermocouple junctions 50 and 48 are shown.

Figure 5:
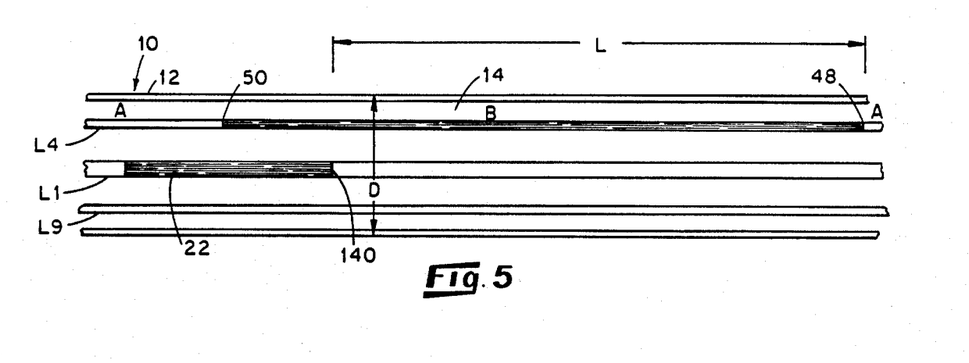
FIG. 5 is a longitudinal cross-sectional view of a sensor.

In order to construct an accurate analog level detector 10 in accordance with the structure shown in FIG. 5, a relationship should be maintained between the length from the heater segment 22 to the cold junction 48 and the diameter of the sheath 12. In FIG. 5, the distance from the cold thermocouple junction 48 to the nearest end 140 of the heater segment 22 is represented by the letter "L". The diameter of the sheath 14 is represented by the letter "D". In the preferred embodiment, the detector 10 is constructed on a larger scale and then is drawn down until "L" divided by "D" is equal to about one hundred sixty, and in this construction, the thermocouple 48 substantially is not heated. The diameter of the detector 10 would vary proportionally to the number of lines therein. A detector 10 having four lines total would have a preferred diameter of about 0.052 inches and, if it had nine lines, the preferred diameter would be about 0.080 inches. In either case, "L" is preferably about ten inches. As "L" divided by "D" decreases, the cool junction 48 becomes increasingly heated by the heater segment 22. The electrical insulation 14 must be thermally conductive so that the heat from segment 22 is operable to heat the hot junction 50. Thus, some heat will be transmitted to the cold junction 48 as well. However, if "L" divided by "D" is large, the heat transmitted to the cold junction 48 will be insignificant.

Figure 6:
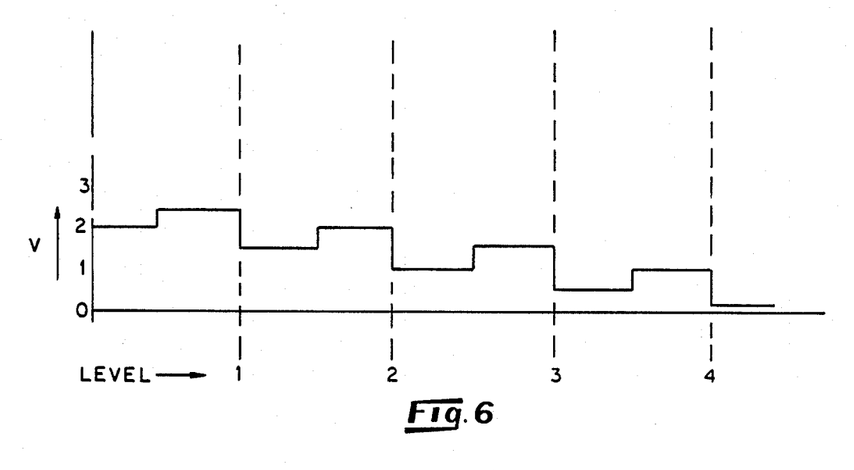
FIG. 6 is a graph of voltage on a measurement wire versus coolant level illustrating a possible situation of ambiguity.

However, if "L" divided by "D" is decreased to within a range of about ten to thirty, the detector will not function well and ambiguity may be introduced into the system. The exact minimum L/D that is acceptable depends upon the materials used and the noise in the system. Under excellent conditions, a detector 10 having L/D=10 will work, but it is preferred to have L/D>20 and it is most preferred to have L/D>30. As an example, the graph in FIG. 6 illustrates a possible ambiguous voltage output that could be produced by line L4 if "L" divided by "D" is not sufficiently large. Referring to FIG. 6 and FIG. 1, line L4 originally produces a two volt signal when boundary 26 is in the position shown in FIG. 1. Since "L" divided by "D" is insufficiently large, the cold junctions 36, 40, 44 and 48 are heated to some extent and the overall voltage potential created by the thermocouple junction pairs in line L4 is reduced. As the boundary 26 rises and covers the cold junction 36, the junction 36 will be cooled and the voltage appearing on line L4 will rise to two and one-half volts. When the boundary 26 rises to cover junction 38, the voltage will drop to one and one-half volts. As the boundary continues to rise, it will cover the cold junction 40 and the voltage will return to two volts. At this point it will be appreciated that a point of ambiguity has been reached. A two volt signal on line L4 indicates that the boundary 26 is either below the thermocouple junction 36 or is between thermocouple junctions 40 and 42. Likewise, a voltage of one and one-half volts indicates that the boundary 26 is either between thermocouple junctions 38 and 40 or between thermocouple junctions 44 and 46. A one volt output indicates that the boundary 26 is either between junctions 42 and 44 or 48 and 50. In a four line detector 10 using alumel and chromel line segments, using alumina insulation 14 and a stainless steel sheath 12, and having about 0.1 millivolts between thermocouple junction pairs (such as 48 and 50), the ambiguity point as illustrated by FIG. 6 is reached when "L" divided by "D" is equal to about 20. As "L" divided by "D" increases, the cold junctions are heated less and the ambiguity as illustrated in FIG. 6 will be eliminated, but with a relatively small "L" divided by "D", for example in the range of 10 to 30, the voltage fluctuations due to partially heated cold junctions will still create difficulty in accurately ascertaining the position of boundary 26. In order for the detector 10 to function properly, it is most preferred to maintain "L" divided by "D" in excess of 30.

In the above discussion, one volt has been used as a nominal differential voltage created by a pair of thermocouple junctions such as junctions 48 and 50. The actual voltage will vary according to the materials used and the temperature difference between the junctions. Generally, the temperature difference between the junctions, such as junctions 48 and 50, will be proportional to the power supplied to the heater cable line L1, but as the power to line L1 increases, the tendency to heat cold junctions, such as junction 48, increases. Also, it is desirable in many applications to have a minimum power supplied to the heater cable, line L1. On the other hand, the power level on line L1 must remain sufficiently high to produce detectable and reliable differential voltages across the thermocouple junction pairs, such as junctions 48 and 50. In order to satisfy these competing interest, it has been discovered that the power supplied to the heater cable line L1 should be chosen to place a differential voltage of 0.1 millivolts across the hot and cold junction pairs (such as 48 and 50). This voltage level is chosen as a minimum necessary to provide reliable readings in the presence of the noise present in the detector 10 and the indicator system such as shown in FIG. 4 or other systems with which the detector interfaces.

By referring to the diameter of the detector or "D" in the above discussion, it is not intended to imply that the detector 10 must have a circular cross-section. If a different geometrical cross-section is preferred, the term diameter or "D" will be understood to refer to the effective diameter of the detector 10; that is, the diameter of a circular cross-section that would result in the same heat transfer to the environment as the different geometrical cross-section.

Figure 7:
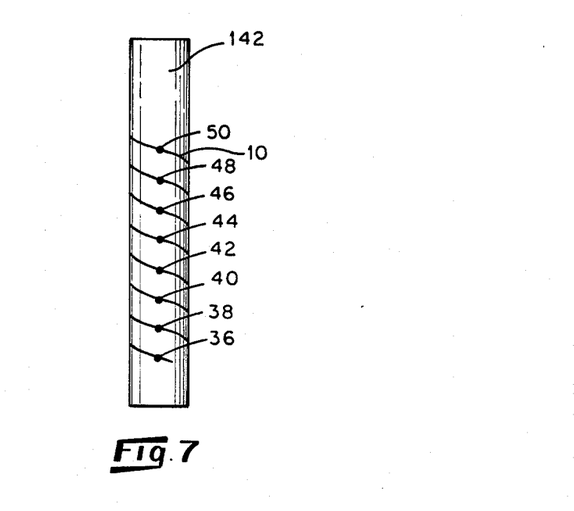
FIG. 7 illustrates an embodiment in which a sensor is wound around a cylinder to increase resolution.

When the detector 10 is reduced in diameter so that it has a diameter of about 0.062, for example, with an "L" divided by "D" of about 160, the accuracy and reliability of the detector 10 is greatly increased, but because of its length and the distance between hot junctions, the resolution of the device has been reduced. For example, if the distance between the junctions 50 and 46 and the line L4 was disposed linearly in the vessel 23 as shown in FIG. 1, the detector could measure the level of the coolant 24 only within a range of plus or minus 10 inches. In order to increase the resolution of the detector 10, the geometry of detector 10 may be changed. For example, instead of placing line L4 within the vessel 23 in an orientation generally perpendicular to the boundary 26, the detector could be placed within the vessel 23 in an inclined position and, thus, the vertical distances between the thermocouple junctions would be reduced depending upon the inclination angle. Also, since the detector 10 has been drawn down to a diameter of about 0.062 inches, it is flexible and may be folded back upon itself or coiled as illustrated in FIG. 7. In this manner, again, the vertical distances between the junctions will be decreased. In the embodiment shown in FIG. 7, the detector 10 has been wrapped around a cylinder 142 with the junctions 36-50 aligned in a row along the cylinder. It will be readily appreciated that the vertical distances between the junctions 36-50 has been greatly reduced by spiraling the detector 10 around the cylinder 142. In this manner, the resolution of the detector is increased.

Although particular embodiments have been described in the foregoing Detailed Description, it will be appreciated that the invention is capable of numerous rearrangements, modifications and substitutions of parts without departing from from the scope of the invention. The embodiments described herein are intended to be exemplary in nature and it will be understood that the lengths of the detectors, the materials used in the detectors, the positions of lines L1-L9 within sheath 12, and the geometry of the detectors may be varied from the embodiments disclosed herein.

What is claimed is:

1. An apparatus for detecting the location of a boundary between two substances having different thermal absorption properties comprising:
   an elongate thermally conductive sheath for being disposed once across the boundary;
   a plurality of elongate wire sensors for being disposed once across the boundary between the two substances, said sensors being disposed within said sheath and extending for substantially the entire length thereof, each of said sensors being constructed of a-type segments and b-type segments, said segments, being connected with alternating types connected end-to-end so that a series of a-type to b-type junctions are formed along said sensors, said a-type segments being constructed of a material different from said b-type segments so that thermocouple junctions are formed between a-type and b-type segments;
   a common return wire disposed in said sheath and extending substantially the length thereof, said return wire being connected at one end to the ends of said elongate wire sensors;
   a segmented heating element having a plurality of heating segments for heating selected ones of said thermocouple junctions and having a plurality of non-heating segments interposed between the heating segments in series;
   said wire sensors and said heating element being disposed in an adjacent side-by-side substantially parallel relationship;
   means for electrically insulating said sensors and said return wire, one from the other along their length except at the connections at their ends, and from said heating element, said sheath and the two substances in which the sensor is disposed, said electrical insulation means being thermally conductive for transferring heat from said heating element to said sensor and from said sensor and heating element through said sheath to the two substances in which said sensor is disposed so that the temperatures of said heated junctions are dependent in part upon the substance in which the junctions are disposed; and
   means connected to said sensor and return wire for measuring the voltage potential across said sensor and indicating the location of the boundary between the two substances.

2. The apparatus of claim 1 wherein said sensors, measuring means and heating element further comprise:
   an analog measuring wire disposed in and extending for substantially the entire length of said sheath and being constructed of a plurality a-type segments and a plurality of b-type segments and having plurality of thermocouple junctions formed along the length thereof, said analog measuring wire being connected at one end to said common return wire;
   said segmented heating element being disposed to heat alternate ones of said thermocouple junctions in said analog measuring wire to form a series of alternating heated junctions and cold junctions, said heated junctions being spaced sufficiently apart from said cold junctions that said heater cable is operable to heat substantially only said heated junctions and the voltage potential across said analog measuring wire is the sum of the differential voltage potentials produced by the heated and cold junctions;
   an analog voltage meter connected between the analog measuring wire and the common wire for measuring voltage potential and indicating the position of said boundary;
   a plurality of digital measuring wires disposed in a parallel relationship within said sheath and extending for substantially the entire length thereof, each of said digital wires being constructed of a-type and b-type segments and having a plurality of thermocouple junctions, each of said thermocouple junctions in said digital measuring wires being disposed proximate to a heating segment of said segmented heating element and being heated thereby, said thermocouple junctions of said digital measuring wires being positioned so that the voltage potential across said plurality of said digital measuring wires is a digital representation of the position of the boundary, each of said digital measuring wires having one end connected to said common return wire; and
   means for measuring the voltage potential between each of said digital measuring wires and said common return wire and indicating the position of said boundary.

3. The apparatus of claim 1 further comprising:
   a plurality of discrete measuring wires constructed of a-type and b-type segments for sensing the presence and absence of the boundary at discrete locations, said discrete wires being disposed in said sheath and extending for substantially the entire length thereof, each discrete measuring wire having a heated thermocouple junction disposed proximate to a heating segment of said heating element for being heated thereby and having a cold thermocouple junction, said heated junctions being disposed at the locations to be sensed by said discrete measuring wires;
   said common return wire connected to one end of each of said discrete measuring wires; and
   means for measuring the voltage potential between said common return wire and each of said discrete measuring wires and for indicating the position of said boundary.

4. An apparatus for detecting the location of a boundary between two substances having different thermal absorption properties comprising:

- an elongate metal sheath having upper and lower ends;
- a plurality of measuring wires of substantially equal length disposed in a parallel relationship within said sheath, each of said measuring wires being constructed of a-type segments and b-type segments and extending through substantially the entire length of said sheath, said segments being connected with alternating types connected end-to-end so that a series of a-type and b-type junctions are formed in said plurality of measuring wires, said a-type segments being constructed of a material different from said b-type segments so that the thermocouple junctions are formed between the a-type and b-type segments;
- a common return wire connected to one end of each of said measuring wires and extending through and within substantially the entire length of said sheath;
- means for heating selected thermocouple junctions in said plurality of measuring wires;
- means for electrically insulating said plurality of measuring wires and said common return wire within said sheath from said heating means, said sheath, each other (except at their points of connection) and the two substances said electrical insulating means being thermally conductive for transferring heat from said heating means to said measuring wires and from said measuring wires and heating means through said sheath to the two substances, whereby the temperatures of the heated junctions are dependent in part upon the substance in which the junctions are disposed;
- said thermocouple junctions in said plurality of measuring wires being disposed along said wires so that the voltage potential across said plurality of measuring wires is a digital representation of the position of the boundary; and
- means for detecting the voltage potential between each of said plurality of measuring wires and said common return and indicating the position of said boundary.

* * * * *